United States Patent
Ma et al.

(10) Patent No.: US 11,782,180 B2
(45) Date of Patent: Oct. 10, 2023

(54) MIXED AIR-HANG RESPONSE FOR CORRECTING A FORMATION SIGNAL OF A MIXED SET MEASURING DEVICE

(71) Applicant: Halliburton Energy Services, Inc., Houston, TX (US)

(72) Inventors: Jin Ma, Houston, TX (US); Hsu-Hsiang Wu, Sugar Land, TX (US); Li Pan, Singapore (SG); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

(21) Appl. No.: 17/465,249

(22) Filed: Sep. 2, 2021

(65) Prior Publication Data

US 2023/0067114 A1 Mar. 2, 2023

(51) Int. Cl.
*G01V 3/26* (2006.01)
*E21B 47/12* (2012.01)
*G01V 1/50* (2006.01)
*G01V 3/30* (2006.01)

(52) U.S. Cl.
CPC ............. *G01V 3/26* (2013.01); *E21B 47/12* (2013.01); *G01V 1/50* (2013.01); *G01V 3/30* (2013.01)

(58) Field of Classification Search
None
See application file for complete search history.

(56) References Cited

U.S. PATENT DOCUMENTS

| | | | |
|---|---|---|---|
| 4,800,496 A | 1/1989 | Barber et al. | |
| 7,027,923 B2 | 4/2006 | Barber et al. | |
| 10,942,288 B2 | 3/2021 | Ma | |
| 2015/0032375 A1* | 1/2015 | Bertrand | G01V 3/28 702/7 |
| 2015/0301222 A1 | 10/2015 | Davydychev et al. | |
| 2019/0137646 A1* | 5/2019 | Frey | G01V 3/12 |

* cited by examiner

*Primary Examiner* — Patrick Assouad
*Assistant Examiner* — Haidong Zhang
(74) *Attorney, Agent, or Firm* — Kilpatrick Townsend & Stockton LLP (57) ABSTRACT

Certain aspects of the present disclosure relate to calibrating a formation signal for a mixed set measurement device. A first air-hang response of a first measurement device for a tubular string associated with a drilling operation can be measured. A second air-hang response of a second measurement device for the tubular string associated with the drilling operation can be measured. The first air-hang response and the second air-hang response can be used to determine a mixed air-hang response of the mixed set measurement device. The mixed air-hang response can be used to calibrate a formation signal for the mixed set measurement device.

20 Claims, 5 Drawing Sheets

MIXED AIR-HANG RESPONSE FOR CORRECTING A FORMATION SIGNAL OF A MIXED SET MEASURING DEVICE

TECHNICAL FIELD

The present disclosure relates generally to wellbore device calibration and, more particularly (although not necessarily exclusively), to determining a mixed air-hang response for calibrating a formation signal associated with a modularized wellbore tool.

BACKGROUND

A wellbore can be formed in a subterranean formation for extracting produced hydrocarbon or other suitable material. One or more wellbore operations can be performed with respect to the wellbore (e.g., drilling to form the wellbore, extracting produced hydrocarbon, etc.). The wellbore operations can include or otherwise involve gathering data with respect to the wellbore. The data can include information about the wellbore such as information about downhole conditions (e.g., during drilling). The data can be gathered by one or more wellbore measurement devices that can be positioned in the wellbore. The measurement devices can be calibrated outside of the wellbore, for example, using an air-hang calibration process. But, the air-hang calibration process may not be accurate due to various factors. For example, the measurement devices may be too large to hang in an air-hang configuration. Additionally, different combinations of measurement devices can be used, and this may lead to inaccurate data.

DETAILED DESCRIPTION

Certain aspects and examples of the present disclosure relate to determining a mixed air-hang response of a modularized wellbore tool for use in calibrating a formation response associated with the modularized wellbore tool. The modularized wellbore tool can include one or more measurement devices that can gather or otherwise detect data with respect to a wellbore. The measurement devices can include one or more transmitters, one or more receivers, other suitable components for the measurement devices, or a combination thereof. The modularized wellbore tool can be calibrated using an air-hang calibration process. For example, an air-hang response of the modularized wellbore tool can be determined and used to calibrate the modularized wellbore tool. Various combinations of transmitters and receivers of the modularized wellbore tool can be used in the air-hang calibration process. For example, a first air-hang response, using a first transmitter and a first receiver, and a second air-hang response, using a second transmitter and a second receiver, can be determined. The first air-hang response and the second air-hang response can be used, for example in combination with a mixed measurement device of the modularized wellbore tool, to determine a mixed air-hang response. In some examples, the mixed measurement device can include the first transmitter and the second receiver or the second transmitter and the first receiver, or other suitable combinations of receivers and transmitters. The mixed air-hang response can be used to calibrate the formation response of the mixed-set measurement device.

One or more air-hang calibration processes can be used to calibrate various wellbore tools such as logging-while-drilling resistivity logging tools or other suitable wellbore tools. An air response of a wellbore tool during air-hang calibration can be contributed to by various offset factors from tool construction. The air response of the wellbore tool can be the baseline of the tool response and can be calibrated or used for calibration to cause the tool response to match a model response, which can be an expected response of the wellbore tool. For modularized wellbore tools, such as deep resistivity tools, conventional air-hang calibration methods can be difficult to implement due various challenges. For example, a large amount of spacing between a transmitter and a receiver of the wellbore tool can cause difficulty in hanging the whole tool string in air. Additionally, a rig site in which the wellbore tool may be used may switch receiver subs to match with a transmitter from a different set to perform one or more wellbore operations, but the rig site may not include resources or configurations to air-hang the wellbore tool.

A method can be used to generate mixed air-hang coefficients for wellbore tools that are hanged in the air separately but are mixed and matched for modularized receivers or transmitters. An efficiency of calibration relating to mixed-tool antenna modules can be improved, and the accuracy of the air-hang calibration for mixed wellbore tool can be improved.

Tool calibration can be used to successfully interpolate formation parameters from wellbore tool responses. In some examples, in order to interpret or invert the formation parameters, database searching or response model calculation can be performed such that tool responses can be matched and the formation parameters can be identified. But, a constant offset between a tool response and a modeling response or database can exist even with similar or identical formation parameters. The constant offset can be caused by various factors such as electronic offset, mandrel effect, imperfect dipole coil from a wellbore tool-construction process, other suitable sources of offset, or a combination thereof. Accordingly, a wellbore tool can be calibrated to remove the offset from the measurement so that the formation parameters can be interpreted or inverted properly.

Air-hang calibration can be used to calibrate the wellbore tools, which can include resistivity logging tools. During an air-hang calibration, a crane, or other suitable hanging device, can be used to hang the wellbore tool off the ground to prevent detecting a ground response. Additionally, the air-hang calibration can include a sufficient distance between the wellbore tool and the hanging device to avoid reflection of signals with respect to the hanging device. For modularized wellbore tools (such as deep resistivity tools or other suitable wellbore tools), the air-hang calibration operations can be difficult to implement due to various challenges. For example, a large amount of spacing between a transmitter and a receiver of the wellbore tool can make it difficult to hang the modularized wellbore tool in air. Additionally, low-frequency in the large spacing can make it difficult to avoid ground reflection, rig reflection, and the like. In some examples, longer distances between the wellbore tool and the ground or the rig may be desirable for air-hang calibration of the wellbore tool. The modularized tool may include more than one transmitter, more than one receiver, or a combination thereof, and one air-hang calibration may not account for measurements of the transmitters and receivers of the wellbore tool. In some examples, a receiver can be assembled with or otherwise paired with a different transmitter for various wellbore operations.

Other air-hang calibration methods (e.g., in-situ calibration, etc.) can involve receiving a measurement from a third-party or sonde tool for inverting formation parameters. The formation parameters can be used to generate a modeling response as a reference to calibrate a response of the wellbore tool. But, the other air-hang calibration methods may not be accurate or efficient. For example, the formation parameters determined by the other air-hang calibration methods may not be accurate due to complex formation structures (e.g., faults, anisotropy layer, etc.) and for other suitable reasons. Additionally, the other calibration methods may be performable from a limited amount of tool configurations, tool positions, etc. in different sections of a wellbore.

An air-hang calibration method can be used to improve accuracy and performance of the other air-hang calibration methods. For example, air-hang calibration coefficients can be determined for mixed transmitters and receivers with respect to a modularized wellbore tool. For the modularized wellbore tool with a first transmitter and a first receiver pair (e.g., a logging-while-drilling tool), an air-hang response can be calculated as Vrx1, where Vrx1 a complex receiver voltage on a first receiver that may be normalized to a transmitter current on the first transmitter. The amplitude (in units of dB) and phase (in unit of degrees) of Vrx1 can be determined in Equation 1 and Equation 2:

$$\text{Amp\_rx1} = -20 \times \log_{10}(\|Vrx1\|) \quad (1)$$

$$\text{Phase\_rx1} = \text{atan2}\left(\frac{\text{image }(Vrx1)}{\text{real }(Vrx1)}\right) \times 180/\pi \quad (2)$$

For a second modularized wellbore tool that includes a second transmitter and a second receiver pair, an air-hang response can be determined as Vrx2, where Vrx2 is a complex receiver voltage associated with the second receiver that can be normalized to a transmitter current of the second transmitter. The amplitude and phase can be determined in Equation 3 and Equation 4:

$$\text{Amp\_rx2} = -20 \times \log_{10}(\|Vrx2\|) \quad (3)$$

$$\text{Phase\_rx2} = \text{atan2}\left(\frac{\text{image }(Vrx2)}{\text{real }(Vrx2)}\right) \times 180/\pi \quad (4)$$

For a modularized wellbore tool that can be mixed, for example, with the first transmitter and the second receiver, the second transmitter and the first receiver, or a combination thereof, an air-hang response ($Vrx_{mix}$, $Amp_{mix}$, $Phase_{mix}$) for the modularized wellbore tool can be determined using Equation 5, Equation 6, and Equation 7:

$$Vrx_{mix} = \sqrt{Vrx1 \times Vrx2} \quad (5)$$

$$Amp_{mix} = (Amp_{rx1} + Amp_{rx2})/2 \quad (6)$$

$$Phase_{mix} = (Phase_{rx1} + Phase_{rx2})/2 \quad (7)$$

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
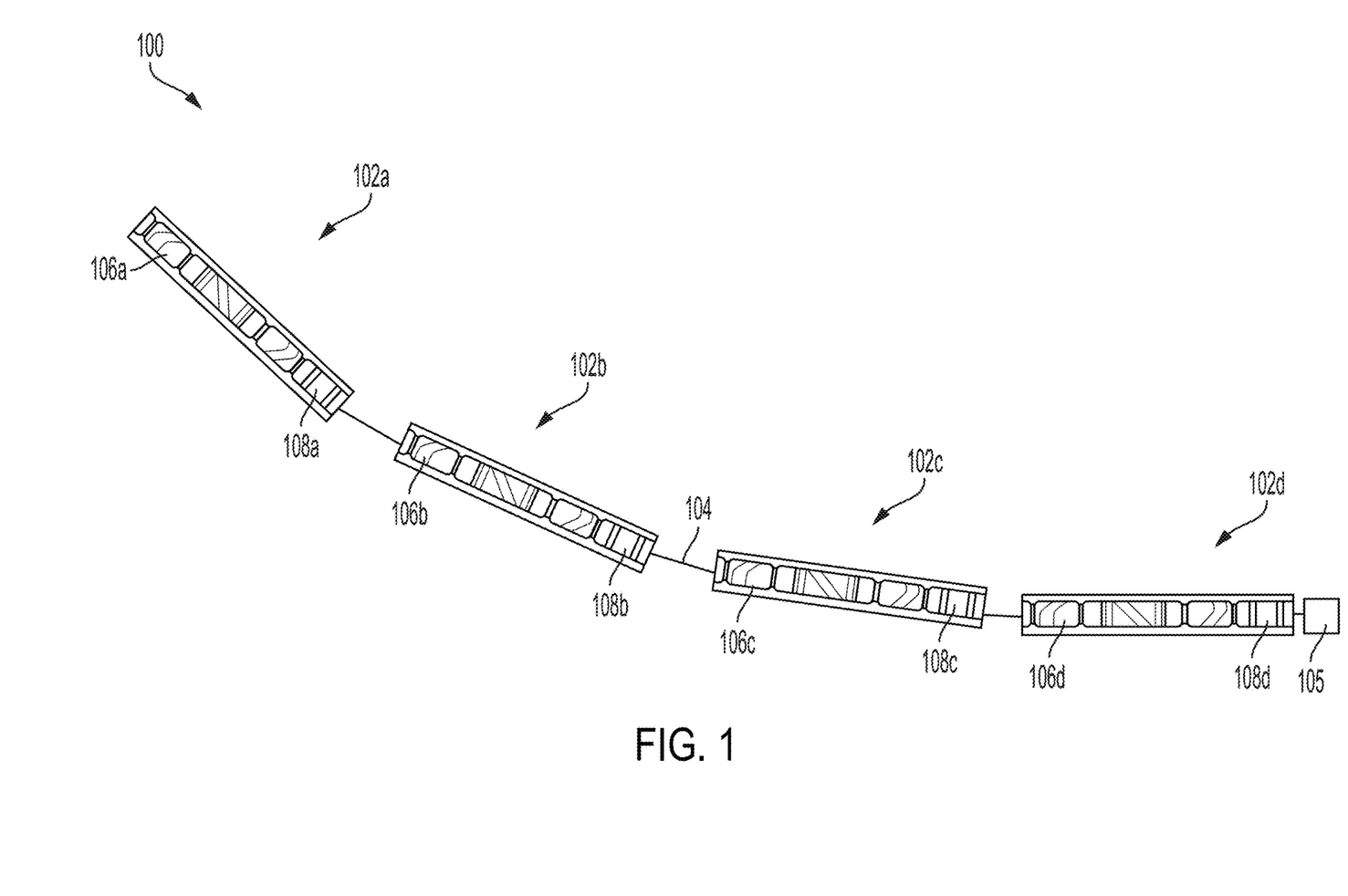
FIG. 1 is a schematic of a modularized wellbore tool that includes a set of measurement devices that can measure a formation signal in a wellbore according to one example of the present disclosure.

FIG. 1 is a schematic of a modularized wellbore tool 100 that includes a set of measurement devices 102a-d that can measure a formation signal according to one example of the present disclosure. The measurement devices 102a-d can be positioned in a wellbore via a tubular string 104 (e.g., a work string, a tool string, etc.). Additionally, the tubular string 104 can include a drill bit 105 or other suitable components that can be positioned in the wellbore, for example, during a drilling operation with respect to the wellbore.

The measurement devices 102a-d can be, or can otherwise include, logging-while-drilling resistivity tools or other suitable wellbore tools for measuring downhole conditions relating to the wellbore during the drilling operation. In some examples, each measurement device of the modularized wellbore tool 100 can include one or more receivers, one or more transmitters, or a combination thereof. For example, as illustrated in FIG. 1, the measurement device 102a includes receiver 106a and transmitter 108a, the measurement device 102b includes receiver 106b and transmitter 108b, the measurement device 102c includes receiver 106c and transmitter 108c, and the measurement device 102d includes receiver 106d and transmitter 108d. In other examples, the modularized wellbore tool 100 can include other suitable amounts (e.g., more than four or less than four) measurement devices 102, and each measurement device 102 can include other suitable amounts (e.g., less than one or more than one) of receivers 106 and transmitters 108. In these examples, the measurement device 102a-d may include different amounts of receivers 106, transmitters 108 or a combination thereof (e.g., the measurement device 102a may include different amounts of receivers 106 or different amounts of transmitters 108 compared to those of the measurement device 102b, etc.).

The modularized wellbore tool 100 can be positioned in the wellbore for gathering data or other suitable information about the wellbore. For example, the modularized wellbore tool 100 can transmit (e.g., using one or more of the transmitters 108a-d) an electromagnetic signal into a formation in which the wellbore is formed. The modularized wellbore tool 100 can receive (e.g., via one or more of the receivers 106a-d) one or more electromagnetic signals from the formation that can indicate information about the formation. The received electromagnetic signals can include or can be a formation response that can be detected by the modularized wellbore tool 100. The modularized wellbore tool 100 can be calibrated to correct the formation response. For example, a mixed air-hang response can be determined using a set of transmitter-receiver pairs of the modularized wellbore tool 100. The transmitter-receiver pairs can include at least one transmitter and at least one receiver. For example, a pair can include the receiver 106a and the transmitter 108a, the receiver 106b and the transmitter 108b, the receiver 106c and the transmitter 108c, or any other suitable combination of transmitters and receivers. The mixed air-hang response can be used to calibrate the modularized wellbore tool 100 for correcting the formation response detected by the modularized wellbore tool 100.

Figure 2:
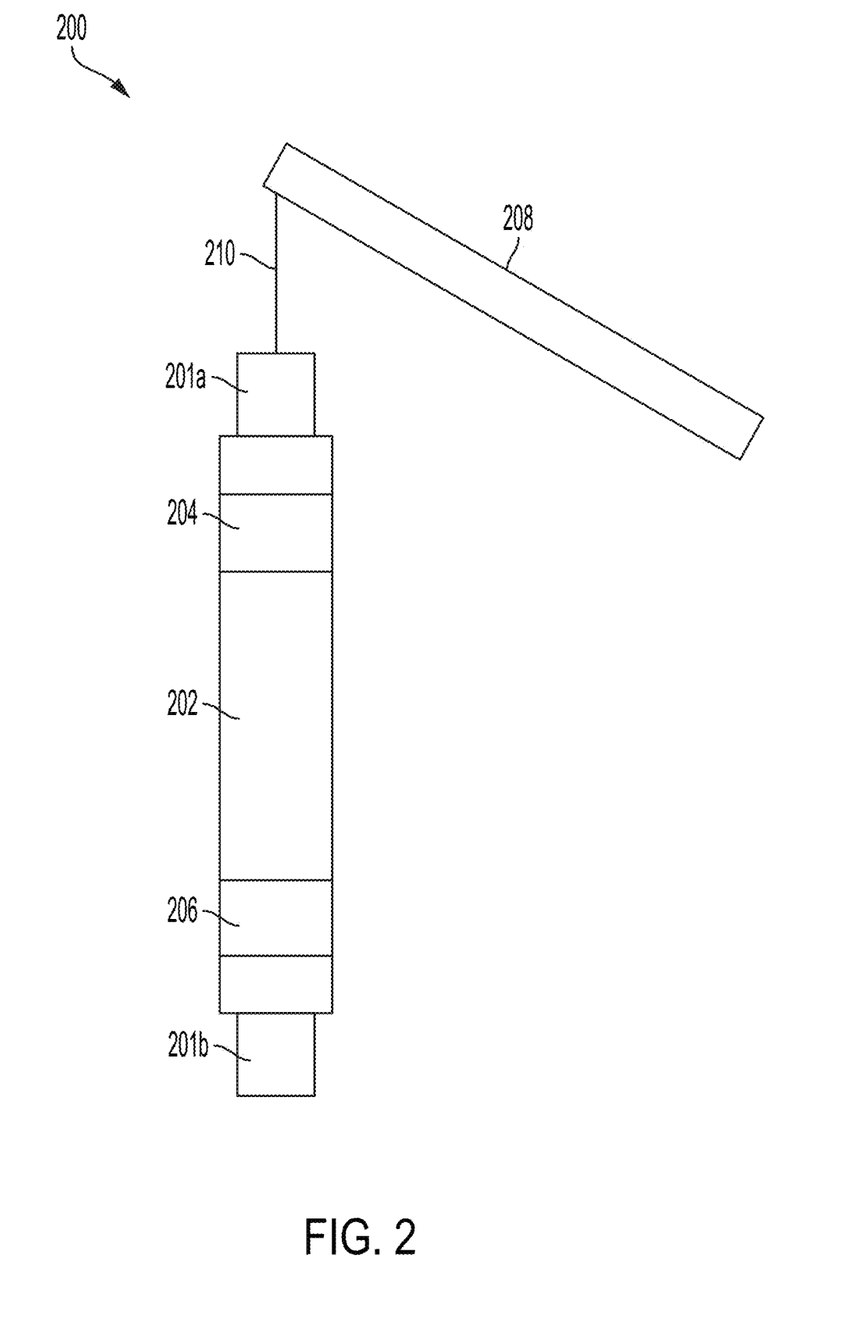
FIG. 2 is a simplified schematic of a tubular that includes a measurement device in an air-hang configuration according to one example of the present disclosure.

FIG. 2 is a simplified schematic of a tubular 200 that includes a measurement device 202 in an air-hang configuration according to one example of the present disclosure. The tubular 200 can include a first end 201a and a second end 201b. The measurement device 202 can include a receiver 204 and a transmitter 206. The measurement device 202 can include other suitable components for gathering data, for example, relating to downhole conditions in a wellbore. In some examples, the receiver 204 can be positioned proximate to the first end 201a and between the first end 201a and the transmitter 206. Additionally, the transmitter 206 can be positioned proximate to the second end 201b and between the receiver 204 and the second end 201b. The receiver 204 and the transmitter 206 can be positioned in any other suitable configuration with respect to the measurement device 202 and the tubular 200.

The tubular 200 can be suspended in air using a hanging device 208. In some examples, the hanging device 208 (e.g., a crane or other suitable type of hanging device) can suspend the tubular 200 via a hanging string 210. The tubular 200 can be suspended by the hanging device 208 such that the measurement device 202 can be in an air-hang configuration. The air-hang configuration of the measurement device 202 can involve the receiver 204 being substantially vertically displaced from the transmitter 206. For example, as illustrated in FIG. 2, the measurement device 202 is in an air-hang configuration in which the receiver 204 is vertically displaced from (and above) the transmitter 206. Other configurations of the transmitter 206 and the receiver 204 are possible with respect to the air-hang configuration (e.g., the transmitter can be vertically displaced from and above the receiver 204, etc.). While in the air-hang configuration, the measurement device 202 can transmit and receive electromagnetic signals that can include an air-hang response of the measurement device 202.

Figure 3:
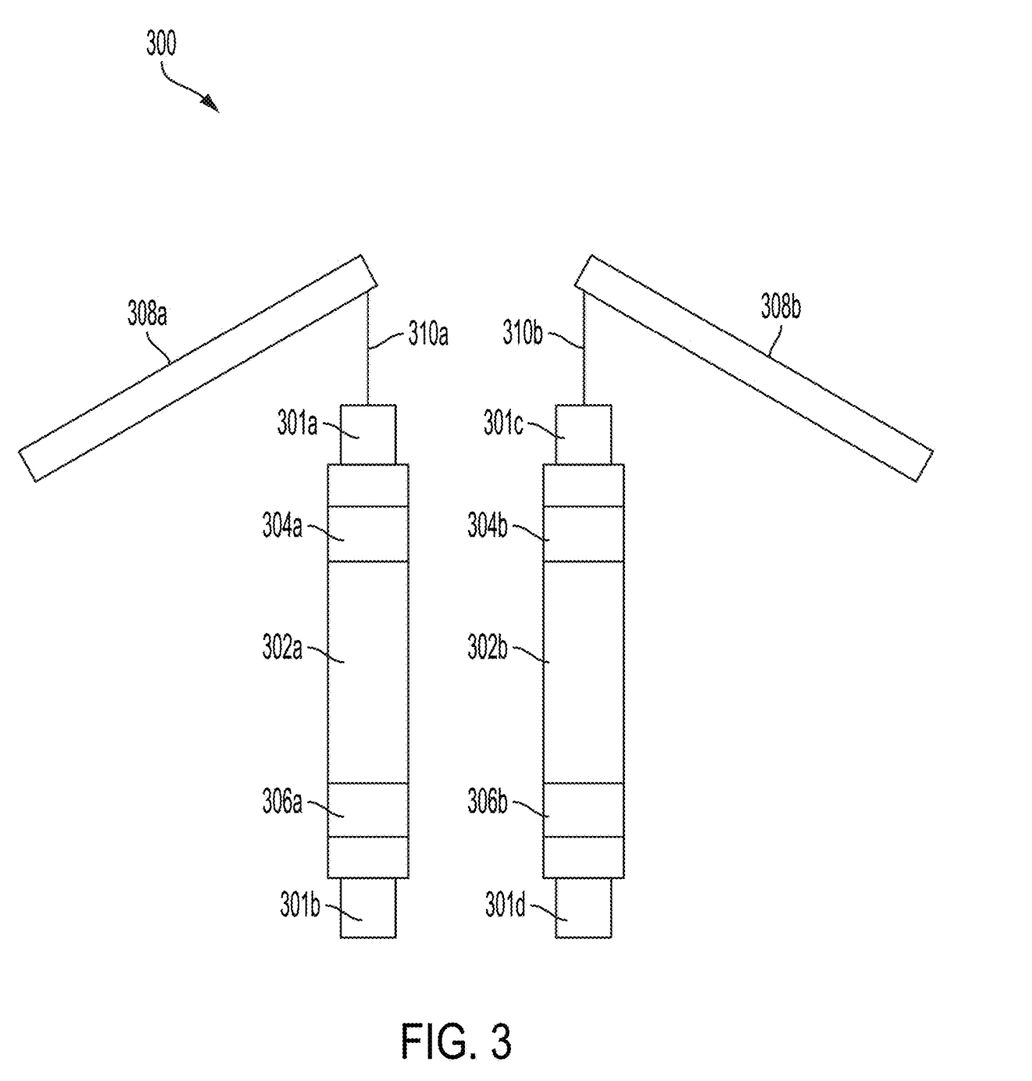
FIG. 3 is a simplified schematic of two tubulars that include two measurement devices in an air-hang configuration according to one example of the present disclosure.

FIG. 3 is a simplified schematic of two tubulars that include two measurement devices in an air-hang configuration according to one example of the present disclosure. As illustrated in FIG. 3, a first tubular 300a includes a first measurement device 302a, and a second tubular 300b includes a second measurement device 302b. Additionally, the first measurement device 302a can include a first receiver 304a and a first transmitter 306a, and the second measurement device 302b can include a second receiver 304b and a second transmitter 306b. The first measurement device 302a can be suspended by a first hanging device 308a and via a first hanging string 310a, and the second measurement device 302b can be suspended by a second hanging device 308b and via a second hanging string 310b. The measurement devices 302a-b can be suspended in the air-hang configuration for determining air-hang responses of the measurement devices 302a-b. While illustrated side-by-side, the measurement devices 302a-b can be suspended by a hanging device at different times (e.g., one after another, etc.).

In response to being suspended in the air-hang configuration, the first measurement device 302a can detect a first air-hang response. For example, the first transmitter 306a can transmit an electromagnetic signal radially outward (or in other suitable directions), and the first receiver 304a can receive one or more electromagnetic signals. The received electromagnetic signals can include or can be the first air-hang response. Additionally, the second measurement device 302b can be used to detect a second air-hang response. For example, the second transmitter 306b can transmit an electromagnetic signal radially outward (or in other suitable directions), and the second receiver 304b can receive one or more electromagnetic signals. The received electromagnetic signals can include or can be the second air-hang response. In some examples, the first air-hang response can be Vrx1 as described with respect to Equation 1 and Equation 2, and the second air-hang response can be Vrx2 as described with respect to Equation 3 and Equation 4.

The first air-hang response and the second air-hang response can be combined or otherwise used to determine a mixed air-hang response for a modularized wellbore tool. For example, the mixed air-hang response can be the square root of the product of the first air-hang response and the second air-hang response (e.g., as described with respect to Equation 5). Additionally, an amplitude (in decibels) of the mixed air-hang response can be determined (e.g., as described with respect to Equation 6) by determining the average of the amplitude of the first air-hang response and the second air-hang response. Additionally, a phase (in degrees) of the mixed air-hang response can be determined (e.g., as described with respect to Equation 7) by determining the average of the phase of the first air-hang response and the second air-hang response. In some examples, the phase of the mixed air-hang response, the amplitude of the mixed air-hang response, or a combination thereof can be determined and can be used to determine the mixed air-hang response.

Figure 4:
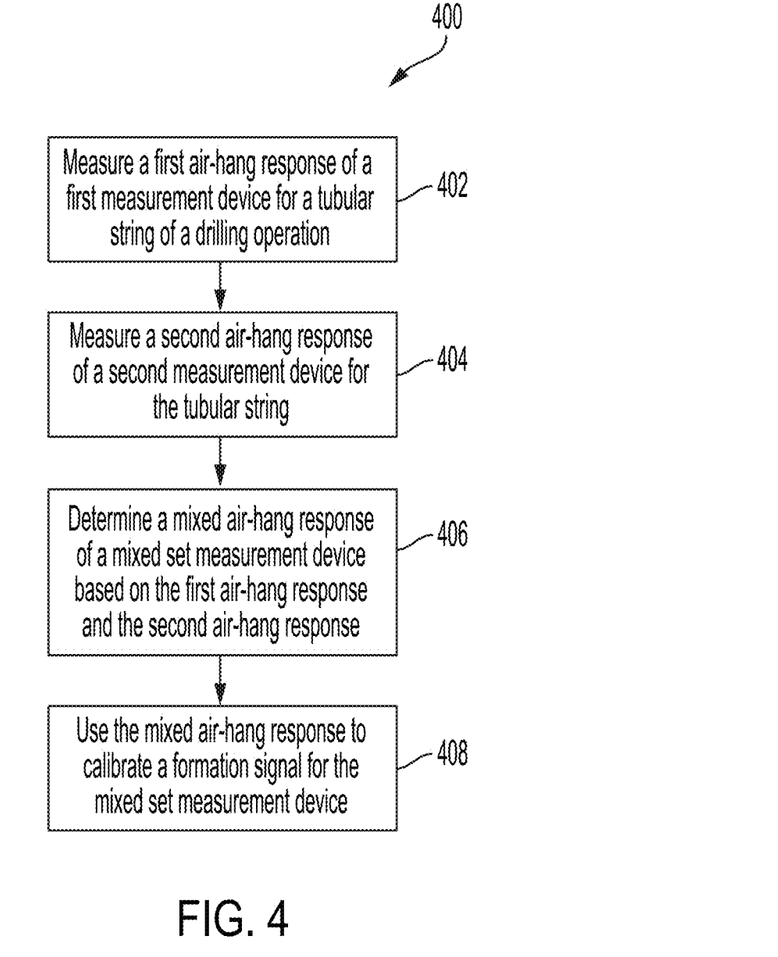
FIG. 4 is a flowchart of a process to determine a mixed air-hang response to calibrate a formation signal with respect to a drilling operation according to one example of the present disclosure.

FIG. 4 is a flowchart of a process 400 to determine a mixed air-hang response of a mixed measurement device to calibrate a formation signal with respect to a drilling operation according to one example of the present disclosure. At block 402, a first air-hang response of a first measurement device (e.g., the measurement device 102a or the first measurement device 302a) for a tubular string 104 of a drilling operation is measured. The first measurement device can include a first transmitter (e.g., the first transmitter 306a) and a first receiver (e.g., the first receiver 304a). The first measurement device can be suspended in an air-hang configuration (e.g., similar to the air-hang configurations illustrated by FIG. 2 or FIG. 3). While in the air-hang configuration, the first measurement device can be used to detect the first air-hang response. For example, the first transmitter can transmit one or more electromagnetic signals outward, or in other suitable directions, into the air, and the first receiver can receive one or more electromagnetic signals. The received electromagnetic signals can include or can be the first air-hang response, which can be a voltage response associated with the first receiver.

At block 404, a second air-hang response of a second measurement device (e.g., the measurement device 102b or the second measurement device 302b) for the tubular string 104 is measured. The second measurement device can include a second transmitter (e.g., the second transmitter 306b) and a second receiver (e.g., the second receiver 304b). The second measurement device can be suspended in an air-hang configuration. While in the air-hang configuration, the second measurement device can be used to detect the second air-hang response. For example, the second transmitter can transmit one or more electromagnetic signals outward, or in other suitable directions, into the air, and the second receiver can receive one or more electromagnetic signals. The received electromagnetic signals can include or can be the second air-hang response, which can be a voltage response associated with the second receiver. The first air-hang response and the second air-hang response can be determined substantially simultaneously. In some examples, the second air-hang response can be determined subsequent to determining the first air-hang response (or in other suitable orders).

At block 406, a mixed air-hang response of a mixed set measurement device is determined based on the first air-hang response and the second air-hang response. The mixed set measurement device can be a modularized wellbore tool (e.g., the modularized wellbore tool 100, a logging-while-drilling resistivity tool, etc.) that can include one or more receivers and one or more transmitters. Additionally, the modularized wellbore tool can be positioned in a wellbore for gathering data or otherwise detecting information about the wellbore (e.g., drilling data). In some examples, the mixed set measurement device can include the first transmitter and the second receiver. In other examples, the mixed set measurement device can include the second transmitter and the first receiver. Other suitable combinations can be possible (e.g., if there are more than two receivers and more than two transmitters). The mixed air-hang response can be determined by using the first air-hang response, the second air-hang response, other suitable information (e.g., a third air-hang response, etc.), or a combination thereof. For example, the mixed air-hang response can be determined by determining the square root of the product of the first air-hang response and the second air-hang response. Alternatively, the mixed air-hang response can be determined by determining an average of the phase associated with the first air-hang response and the second air-hang response or by determining an average of the amplitude associated with the first air-hang response and the second air-hang response.

At block 408, the mixed air-hang response is used to calibrate a formation signal for the mixed set measurement device. The mixed set measurement device can be positioned in a wellbore for gathering data relating to the wellbore. The gathered data can include a formation signal or formation response. For example, a transmitter of the mixed set measurement device can transmit one or more electromagnetic signals out of the wellbore and into a formation (e.g., a subterranean formation in which the wellbore is formed), and a receiver of the mixed set measurement device can receive one or more electromagnetic signals from the formation. The received electromagnetic signals can indicate information about the formation, and a voltage received by the receiver can include or can be the formation signal. As received, the formation signal may not be accurate or may otherwise include other non-useful data. The mixed air-hang response can be used to calibrate or otherwise correct the formation signal. In some examples, the transmitter of the mixed set measurement device, the receiver of the mixed set measurement device, or a combination thereof can be replaced with other suitable components. The mixed air-hang response can be used to correct or calibrate the formation signal or formation response of the mixed set measurement device regardless of the combination of transmitters and receivers used by the mixed set measurement device. For example, in a mixed measurement device that includes more than one receiver, the mixed air-hang response can correct the formation response of more than one receiver.

Figure 5:
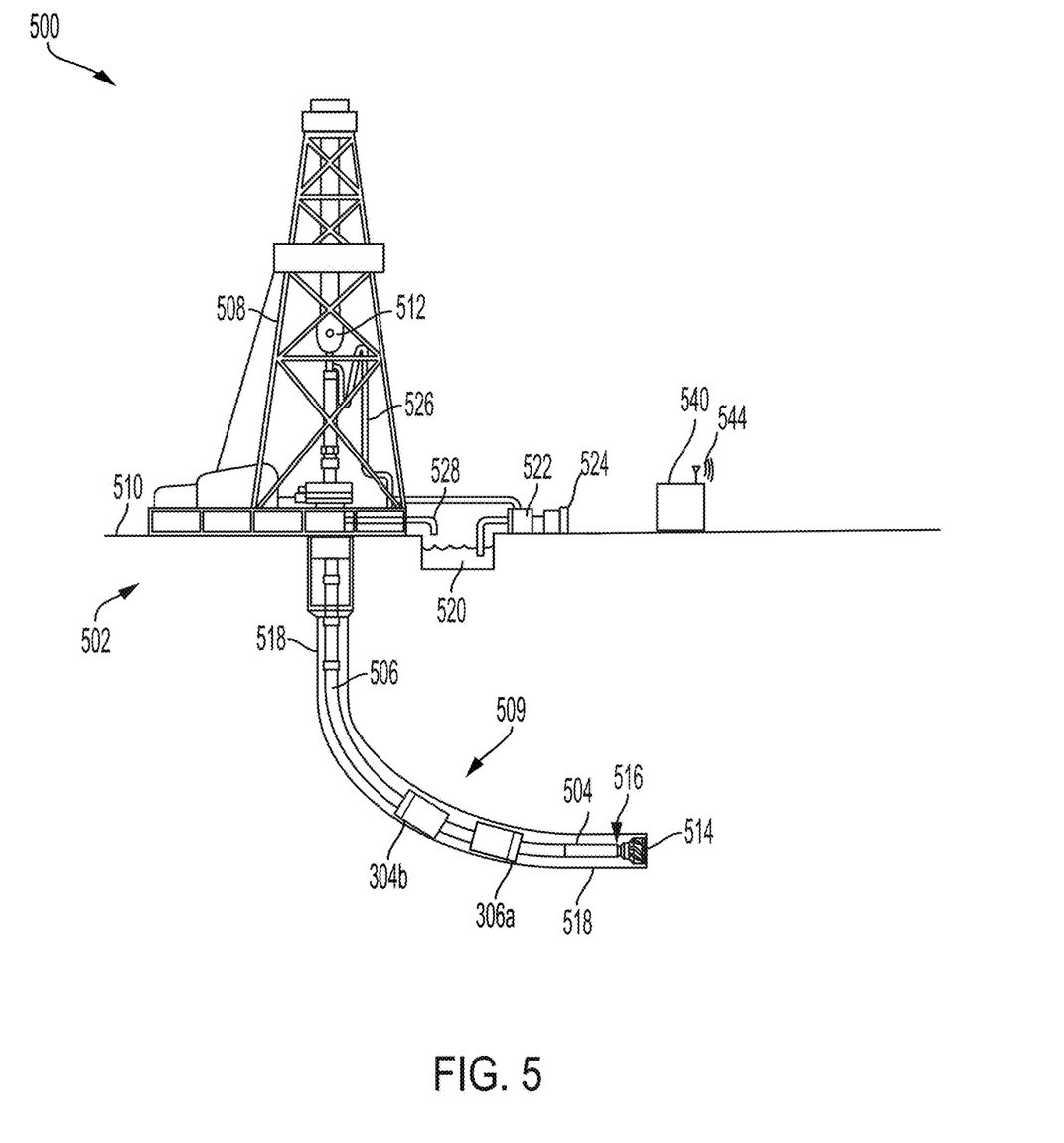
FIG. 5 is a schematic of a well system that includes a tubular that includes a mixed measurement device calibrated using a mixed air-hang response according to one example of the present disclosure.

FIG. 5 is a schematic of a well system 500 that includes a tubular that includes a modularized measurement device calibrated using a mixed air-hang response according to one example of the present disclosure. The well system 500 can include a wellbore 518 that can be used to extract hydrocarbons from a subterranean formation 502. The wellbore 518 can be drilled using the well system 500. The well system 500 may drive a bottom hole assembly (BHA) 504 positioned or otherwise arranged at the bottom of a drill-string 506 extended into the subterranean formation 502 from a derrick 508 arranged at the surface 510. The derrick 508 can include a kelly 512 used to lower and raise the drill-string 506.

The BHA 504 may include a drill bit 514 operatively coupled to a tool string 516, which may be moved axially within a drilled wellbore 518 and can be attached to the drill-string 506. The tool string 516 may include a mixed set measurement device or a modularized wellbore tool 509 for determining conditions in the wellbore 518 or for performing other suitable wellbore operations. The modularized wellbore tool 509 may include or may be part of a measurement unit that may be deployable downhole in the wellbore 518 and may sense data relating to drilling conditions or any other suitable downhole data. The modularized wellbore tool 509 may include one or more receivers, one or more transmitters, other suitable components, or a combination thereof. For example, the modularized wellbore tool 509 can include the second receiver 304b (e.g., from the second measurement device 302b) and the first transmitter 306a (e.g., from the first measurement device 302a). Alternatively, the modularized wellbore tool 509 can include the first receiver 304a and the second transmitter 306b. The modularized wellbore tool 509 may have been calibrated (e.g., using operations of the process 400 described above) using an air-hang calibration process that uses the mixed air-hang response.

During operation, the drill bit 514 can penetrate the subterranean formation 502 to create the wellbore 518. The BHA 504 can control the drill bit 514 as the drill bit 514 advances into the subterranean formation 502. Fluid or "mud" from a mud tank 520 may be pumped downhole using a mud pump 522 that can be powered by an adjacent power source, such as a prime mover or motor 524. The mud may be pumped from the mud tank 520, through a stand pipe 526, which can feed the mud into the drill-string 506 and can convey the mud to the drill bit 514. The mud can exit one or more nozzles (not shown) arranged in the drill bit 514 and can thereby cool the drill bit 514. After exiting the drill bit 514, the mud can circulate back to the surface 510 via the annulus defined between the wellbore 518 and the drill-string 506. Cuttings and mud mixture that can be passed through a flow line 528 can be processed such that a cleaned mud is returned down hole through the stand pipe 526.

The modularized wellbore tool 509 can monitor or otherwise detect data about the drilling operation or any other suitable operation that can be performed with respect to the well system 500. For example, the modularized wellbore tool 509 can detect data relating to logging-while-drilling operations, relating to measuring-while-drilling operations, or relating to other suitable downhole or wellbore operations. The response determined by the modularized wellbore tool 509 can be influenced by a calibration process performed with respect to the modularized wellbore tool 509. For example, the modularized wellbore tool 509 can be calibrated using the process 400 or other suitable process that involves the mixed air-hang response. In some examples, the modularized wellbore tool 509 may detect data relating to the wellbore 518 more accurately than other wellbore tools or mixed set measurement devices calibrated with other air-hang calibration processes that do not use the mixed air-hang response.

In some examples, the well system 500 can include a computing device 540 that can be positioned belowground, aboveground, onsite, in a vehicle, offsite, etc. As illustrated with respect to FIG. 5, the computing device 540 is positioned at the surface 510 but can be positioned in any other suitable location. The computing device 540 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 540. In some examples, the computing device 540 can include input/output interface components (e.g., a display, printer, keyboard, touch-sensitive surface, and mouse) and additional storage. The computing device 540 can be communicatively coupled to the modularized wellbore tool 509 (e.g., via a wireless connection or a wired connection).

The computing device 540 can include a communication device 544. The communication device 544 can represent one or more of any components that facilitate a network connection. In the example illustrated in FIG. 5, the communication device 544 is wireless and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device 544 can use acoustic waves, surface waves, vibrations, optical waves, or induction (e.g., magnetic induction) for engaging in wireless communications. In other examples, the communication device 544 can be wired and can include interfaces such as Ethernet, USB, IEEE 1394, or a fiber optic interface. In an example with at least one other computing device, the computing device 540 can receive wired or wireless communications from the other computing device and perform one or more tasks based on the communications and with respect to the well system 500. For example, the computing device 540 (or a non-transitory computer-readable medium included in the memory of the computing device 540, etc.) can perform the operations, or a subset thereof, described with respect to the process 400 or other suitable operations.

In some aspects, methods, assemblies, and non-transitory computer-readable mediums for calibrating a formation signal for a mixed set measurement device are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: measuring a first air-hang response of a first measurement device for a tubular string associated with a drilling operation, the first measurement device comprising a first transmitter and a first receiver; measuring a second air-hang response of a second measurement device for the tubular string associated with the drilling operation, the second measurement device comprising a second transmitter and a second receiver; determining, using the first air-hang response and the second air-hang response, a mixed air-hang response of a mixed set measurement device that includes the first transmitter and the second receiver or the second transmitter and the first transmitter; and using the mixed air-hang response to calibrate a formation signal for the mixed set measurement device.

Example 2 is the method of example 1, wherein determining the mixed air-hang response of the mixed set measurement device includes determining a square root of a product of the first air-hang response and the second air-hang response.

Example 3 is the method of example 1, wherein determining the mixed air-hang response of the mixed set measurement device includes determining a phase associated with the mixed air-hang response by determining an average of a first phase associated with the first air-hang response and a second phase associated with the second air-hang response.

Example 4 is the method of example 1, wherein determining the mixed air-hang response of the mixed set measurement device includes determining an amplitude associated with the mixed air-hang response by determining an average of a first amplitude associated with the first air-hang response and a second amplitude associated with the second air-hang response.

Example 5 is the method of example 1, wherein the mixed set measurement device is a logging-while-drilling resistivity tool.

Example 6 is the method of example 1, wherein measuring the first air-hang response of the first measurement device includes measuring the first air-hang response while the first measurement device is in an air-hang configuration in which a first transmitter of the first measurement device is substantially vertically offset from a first receiver of the first measurement device, and wherein measuring the second air-hang response of the second measurement device includes measuring the second air-hang response while the second measurement device is in the air-hang configuration in which a second transmitter of the second measurement device is substantially vertically offset from a second receiver of the second measurement device.

Example 7 is the method of example 1, wherein measuring the first air-hang response of the first measurement device includes normalizing the first air-hang response to the first transmitter, and wherein measuring the second air-hang response of the second measurement device includes normalizing the second air-hang response to the second transmitter.

Example 8 is an assembly comprising: a first transmitter calibrated in a first calibration with a first receiver in a first air-hang configuration, the first calibration including a first air-hang response; and a second receiver calibrated in a second calibration with a second transmitter in a second air-hang configuration, the second calibration including a second air-hang response, a formation signal detected by the assembly correctable using a mixed air-hang response determinable using the first air-hang response and the second air-hang response.

Example 9 is the assembly of example 8, wherein the mixed air-hang response is determinable using a square root of a product of the first air-hang response and the second air-hang response.

Example 10 is the assembly of example 8, wherein the mixed air-hang response is determinable using a phase associated with the mixed air-hang response that is an average of a first phase associated with the first air-hang response and a second phase associated with the second air-hang response.

Example 11 is the assembly of example 8, wherein the mixed air-hang response is determinable using an amplitude associated with the mixed air-hang response that is an average of a first amplitude associated with the first air-hang response and a second amplitude associated with the second air-hang response.

Example 12 is the assembly of example 8, wherein the first transmitter and the second transmitter are included in a logging-while-drilling resistivity tool.

Example 13 is the assembly of example 8, wherein the first air-hang configuration involves the first transmitter being substantially vertically offset from the first receiver, and wherein the second air-hang configuration involves the second transmitter being substantially vertically offset from the second receiver.

Example 14 is the assembly of example 8, further comprising a third receiver calibrated in a third calibration process with a third transmitter in a third air-hang configuration, and wherein the mixed air-hang response is usable to correct the formation signal detected by the second receiver and the third receiver.

Example 15 is a non-transitory computer-readable medium comprising instructions that are executable by a processing device for causing the processing device to perform operations comprising: measuring a first air-hang response of a first measurement device for a tubular string associated with a drilling operation, the first measurement device comprising a first transmitter and a first receiver; measuring a second air-hang response of a second measurement device for the tubular string associated with the drilling operation, the second measurement device comprising a second transmitter and a second receiver; determining, using the first air-hang response and the second air-hang response, a mixed air-hang response of a mixed set measurement device that includes the first transmitter and the second receiver or the second transmitter and the first transmitter; and using the mixed air-hang response to calibrate a formation signal for the mixed set measurement device.

Example 16 is the non-transitory computer-readable medium of example 15, wherein the operation of determining the mixed air-hang response of the mixed set measurement device includes determining a square root of a product of the first air-hang response and the second air-hang response.

Example 17 is the non-transitory computer-readable medium of example 15, wherein determining the mixed air-hang response of the mixed set measurement device includes determining a phase associated with the mixed air-hang response by determining an average of a first phase associated with the first air-hang response and a second phase associated with the second air-hang response.

Example 18 is the non-transitory computer-readable medium of example 15, wherein the operation of determining the mixed air-hang response of the mixed set measurement device includes determining an amplitude associated with the mixed air-hang response by determining an average of a first amplitude associated with the first air-hang response and a second amplitude associated with the second air-hang response.

Example 19 is the non-transitory computer-readable medium of example 15, wherein the mixed set measurement device is a logging-while-drilling resistivity tool.

Example 20 is the non-transitory computer-readable medium of example 15, wherein the operation of measuring the first air-hang response of the first measurement device includes measuring the first air-hang response while the first measurement device is in an air-hang configuration in which a first transmitter of the first measurement device is substantially vertically offset from a first receiver of the first measurement device, and wherein the operation of measuring the second air-hang response of the second measurement device includes measuring the second air-hang response while the second measurement device is in the air-hang configuration in which a second transmitter of the second measurement device is substantially vertically offset from a second receiver of the second measurement device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    measuring a first air-hang response of a first measurement device for a tubular string associated with a drilling operation, the first measurement device comprising a first transmitter and a first receiver;
    measuring a second air-hang response of a second measurement device for the tubular string associated with the drilling operation, the second measurement device comprising a second transmitter and a second receiver;
    determining, using the first air-hang response and the second air-hang response, a mixed air-hang response of a mixed set measurement device that includes the first transmitter and the second receiver or the second transmitter and the first transmitter; and
    using the mixed air-hang response to calibrate a formation signal for the mixed set measurement device.

2. The method of claim 1, wherein determining the mixed air-hang response of the mixed set measurement device includes determining a square root of a product of the first air-hang response and the second air-hang response.

3. The method of claim 1, wherein determining the mixed air-hang response of the mixed set measurement device includes determining a phase associated with the mixed air-hang response by determining an average of a first phase associated with the first air-hang response and a second phase associated with the second air-hang response.

4. The method of claim 1, wherein determining the mixed air-hang response of the mixed set measurement device includes determining an amplitude associated with the mixed air-hang response by determining an average of a first amplitude associated with the first air-hang response and a second amplitude associated with the second air-hang response.

5. The method of claim 1, wherein measuring the first air-hang response of the first measurement device includes measuring the first air-hang response while the first measurement device is in an air-hang configuration in which a first transmitter of the first measurement device is substantially vertically offset from a first receiver of the first measurement device, and wherein measuring the second air-hang response of the second measurement device includes measuring the second air-hang response while the second measurement device is in the air-hang configuration in which a second transmitter of the second measurement device is substantially vertically offset from a second receiver of the second measurement device.

6. The method of claim 1, wherein measuring the first air-hang response of the first measurement device includes normalizing the first air-hang response to the first transmitter, and wherein measuring the second air-hang response of the second measurement device includes normalizing the second air-hang response to the second transmitter.

7. The method of claim 1, further comprising controlling one or more components of the drilling operation using the calibrated formation signal.

8. An assembly comprising:
a first transmitter calibrated in a first calibration with a first receiver in a first air-hang configuration, the first calibration including a first air-hang response; and
a second receiver calibrated in a second calibration with a second transmitter in a second air-hang configuration, the second calibration including a second air-hang response, a formation signal detected by the assembly correctable using a mixed air-hang response determinable using the first air-hang response and the second air-hang response.

9. The assembly of claim 8, wherein the mixed air-hang response is determinable using a square root of a product of the first air-hang response and the second air-hang response.

10. The assembly of claim 8, wherein the mixed air-hang response is determinable using a phase associated with the mixed air-hang response that is an average of a first phase associated with the first air-hang response and a second phase associated with the second air-hang response.

11. The assembly of claim 8, wherein the mixed air-hang response is determinable using an amplitude associated with the mixed air-hang response that is an average of a first amplitude associated with the first air-hang response and a second amplitude associated with the second air-hang response.

12. The assembly of claim 8, wherein the first transmitter and the second transmitter are included in a logging-while-drilling resistivity tool.

13. The assembly of claim 8, wherein the first air-hang configuration involves the first transmitter being substantially vertically offset from the first receiver, and wherein the second air-hang configuration involves the second transmitter being substantially vertically offset from the second receiver.

14. The assembly of claim 8, further comprising a third receiver calibrated in a third calibration process with a third transmitter in a third air-hang configuration, and wherein the mixed air-hang response is usable to correct the formation signal detected by the second receiver and the third receiver.

15. A non-transitory computer-readable medium comprising instructions that are executable by a processing device for causing the processing device to perform operations comprising:
measuring a first air-hang response of a first measurement device for a tubular string associated with a drilling operation, the first measurement device comprising a first transmitter and a first receiver;
measuring a second air-hang response of a second measurement device for the tubular string associated with the drilling operation, the second measurement device comprising a second transmitter and a second receiver;
determining, using the first air-hang response and the second air-hang response, a mixed air-hang response of a mixed set measurement device that includes the first transmitter and the second receiver or the second transmitter and the first transmitter; and
using the mixed air-hang response to calibrate a formation signal for the mixed set measurement device.

16. The non-transitory computer-readable medium of claim 15, wherein the operation of determining the mixed air-hang response of the mixed set measurement device includes determining a square root of a product of the first air-hang response and the second air-hang response.

17. The non-transitory computer-readable medium of claim 15, wherein determining the mixed air-hang response of the mixed set measurement device includes determining a phase associated with the mixed air-hang response by determining an average of a first phase associated with the first air-hang response and a second phase associated with the second air-hang response.

18. The non-transitory computer-readable medium of claim 15, wherein the operation of determining the mixed air-hang response of the mixed set measurement device includes determining an amplitude associated with the mixed air-hang response by determining an average of a first amplitude associated with the first air-hang response and a second amplitude associated with the second air-hang response.

19. The non-transitory computer-readable medium of claim 15, wherein the mixed set measurement device is a logging-while-drilling resistivity tool.

20. The non-transitory computer-readable medium of claim 15, wherein the operation of measuring the first air-hang response of the first measurement device includes measuring the first air-hang response while the first measurement device is in an air-hang configuration in which a first transmitter of the first measurement device is substantially vertically offset from a first receiver of the first measurement device, and wherein the operation of measuring the second air-hang response of the second measurement device includes measuring the second air-hang response while the second measurement device is in the air-hang configuration in which a second transmitter of the second measurement device is substantially vertically offset from a second receiver of the second measurement device.

* * * * *